Aug. 2, 1966       H. E. RIORDAN       3,264,497
                  PULSE CONTROL DEVICE
Filed Jan. 3, 1963                    2 Sheets-Sheet 1

HUGH E. RIORDAN
INVENTOR.

BY S. A. Guarratana
Francis L. Masselle
ATTORNEYS

Aug. 2, 1966　　　　H. E. RIORDAN　　　　3,264,497
PULSE CONTROL DEVICE

Filed Jan. 3, 1963　　　　　　　　　　　　2 Sheets-Sheet 2

HUGH E. RIORDAN
INVENTOR.

BY S. A. Giarratana
Francis L. Masselle
ATTORNEYS

United States Patent Office 3,264,497
Patented August 2, 1966

3,264,497
PULSE CONTROL DEVICE
Hugh E. Riordan, Wyckoff, N.J., assignor to General Precision, Inc., Little Falls, N.J., a corporation of Delaware
Filed Jan. 3, 1963, Ser. No. 249,148
3 Claims. (Cl. 307—106)

This invention relates to systems for controlling the impulse content of pulses and more particularly to a system which controls the impulse content by means of an electrical mechanical instrument used as a reference.

Pulse torquing is a technique of energizing torquers in inertial systems. In pulse torquing the torquers are energized by pulses instead of analogue current values. Pulse torquing is used in place of torquing with analogue current because of its compatibility with digital operation. For example, when it is desired to produce a digital output from a torquer energized by an analogue current value, an analogue to digital conversion circuit is required. When pulse torquing is used a digital output is obtained with much simpler circuitry. Furthermore, the use of pulse torquing eliminates torquer linearity as a primary factor in instrument accuracy. This result is achieved because the current-time envelope or impulse content of all pulses used to energize the torquer is identical. Only the algebraic sum of the number of pulses applied to the torquer varies with varying torque demands. The use of pulse torquing also eliminates linearity requirements for the torquer amplifier. Moreover, in many systems the linearity and scale factor stability of the pickoff are eliminated as direct factors in instrument accuracy when pulse torquing is used.

In systems making use of pulse torquing it is necessary to control the impulse content of each pulse with a precision commensurate with the overall precision required of the system. The systems of the prior art achieved this control of the impulse content electronically. These systems however are too cumbersome and are not too satisfactory. The present invention provides a simple electromechanical instrument which constitutes a reference for the impulse content of the pulses and makes it possible to control the impulse content of the pulses with an accuracy at least as high as that of the best gyros and accelerometers available. Only one device for controlling impulse content is required in each inertial system.

In accordance with the present invention the impulse content of the pulses is controlled by measuring the effect of the pulses on an electromechanical reference and using the information obtained in this manner to control the impulse content of the pulses in order to insure a constant impulse content. The reference quantities for the measurement are the mass and stiffness of the mechanical system. These quantities can be made extremely stable and predictable. In a preferred embodiment of the invention, the electromechanical instrument is similar to force balance accelerometer in which the input acceleration is replaced by a spring bias force. The pulses are applied to the force balance coils of the instrument and produce a force applied in opposition to the spring bias force. The force produced by the force balance coils will be proportional to the impulse content of the pulses. The pickoff of the instrument develops an error signal which is used to control the amplitude of the pulses and thus maintain the impulse content constant. In order to make the unit insensitive to acceleration, the movable mass of the instrument is fully floated in a liquid having the same density as the movable mass. This fluid makes the device fully insensitive to rectilinear acceleration. However, a residual sensitivity to angular acceleration remains. In the preferred embodiment of the present invention the sensitivity to angular acceleration is eliminated by a compensating linkage.

Accordingly, the principal object of the present invention is to provide an improved system for controlling the impulse content of pulses in pulse torquing systems.

Another object of the present invention is to provide a simple system using an electromechanical device as a reference for controlling the impulse content of pulses in pulse torquing systems.

A further object of this invention is to provide an improved impulse content control device.

A still further object of the present invention is to provide a highly accurate impulse content control device.

A still further object of the present invention is to provide a simple highly accurate electromechanical reference for controlling the impulse content of pulses.

Further objects and advantages of the present invention will become readily apparent as the following detailed description of the present invention unfolds and when taken in conjunction with the drawings wherein.

Figure 1:
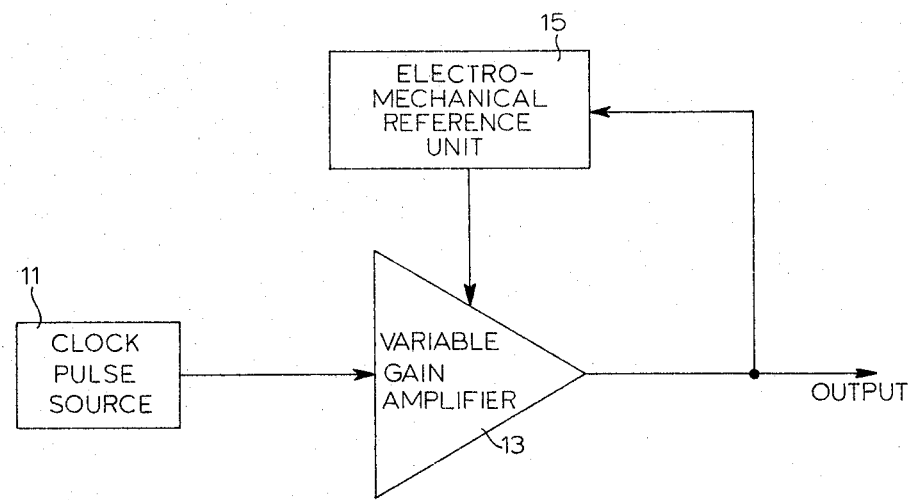
FIG. 1 is a block diagram illustrating the system of the present invention.

As shown in FIG. 1 pulses in a continuous train at a constant repetitive rate are applied from a clock pulse source 11 to the input of a variable gain amplifier 13, which amplifies the applied pulses and applies them to the output of the system. The pulses applied to the output of the system are then applied to the gating circuits of the inertial system, which makes use of them in pulse torquing applications. The output pulses from the variable gain amplifier 13 are also applied to an electromechanical reference unit 15. The electromechanical reference unit 15 in response to the applied pulses generates an output signal, which is applied to the variable gain amplifier 13 to control the gain thereof and maintain constant the impulse content of the output pulses from the variable gain amplifier 13. The electromechanical reference unit 15 operates by converting the applied pulses to a mechanical force, which is applied to the mechanical system of the electromechanical reference unit 15. The mechanical force will be proportional to the impulse content of the pulses. The effect of this force is measured to generate the signal to control the gain of the amplifier 13.

The electromechanical reference unit 15 comprises a force balance system, in which a spring bias force is applied to the movable mass of the accelerometer tending to move the mass from its null position. The input pulses are applied to the accelerometer force balance coils, which apply a force to the movable mass in opposition to the spring bias force, and the pickoff coil is used to generate the control signal applied to the variable gain amplifier 13 to control the gain thereof.

Figure 2:
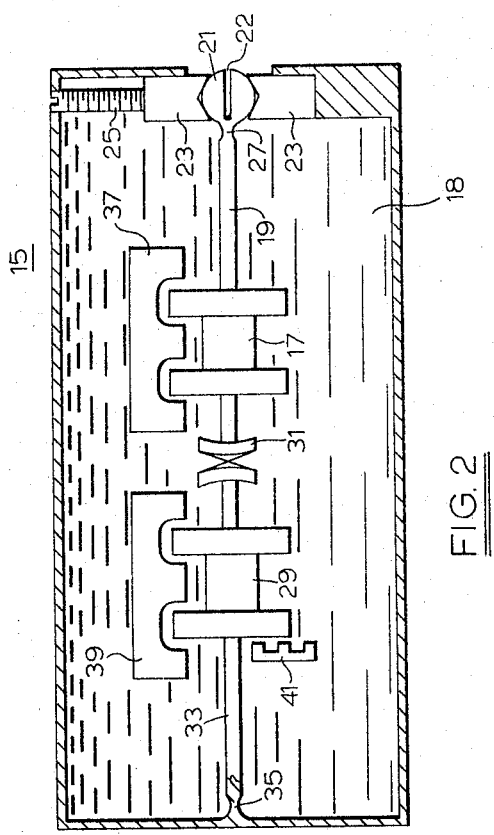
FIG. 2 is a sectional view schematically illustrating the electromechanical instrument used as the reference in the system of the present invention.

As shown in FIG. 2 the electromechanical unit 15 comprises a mass 17 which is supported centrally in a chamber 18 on a rod 19 extending from a cylindrical member 21, to which the rod 19 is fixed. The cylindrical member 21 is held in place between a pair of jaws 23, which are forced together by a screw 25. The angular position of the cylindrical member 21 within the jaws 23 may be adjusted by loosening the screw 25, rotating the cylindrical member 21 to the desired position, and then retightening the screw 25. For the purposes of adjusting the angular position of the cylindrical member 21 a slot or groove 22, which is adapted to cooperate with a screwdriver, is provided in the end of the cylindrical member 21. The rod 19 narrows into a flexible neck 27 adjacent to the cylindrical member 21 so that the mass 17 can pivot about a line in the neck 27 by flexure of the neck 27 against the spring force of the neck 27. A second mass 29 is centrally supported in the chamber 18 adjacent the mass 17 and connected to the mass 17 by a linkage 31 to be described in more detail with respect to FIG. 3. The mass 29 is supported on a rod 33, which is fixed to the wall of the chamber 18. The rod 33 like the rod 19 narrows into a flexible neck 35 adjacent to the wall of the chamber 18 so that the mass 29 can pivot about a line in the neck 35. The linkage 31 forces the masses 17 and 29 to pivot together in opposite angular directions when they pivot so that when the mass 17 moves down pivoting counterclockwise about the pivot point in the neck 27, the mass 29 will move down pivoting clockwise about the pivot point in the neck 35. Force balance coils 37 and 39 are provided to control the position of the masses 17 and 29 respectively in the manner of conventional force balance accelerometers. A pickup coil 41 is provided to sense the position of the mass 29 also in the conventional manner of force balance accelerometers. The force balance coils 37 and 39 are connected in series. The position of the masses 17 and 29 in the chamber 18 can be adjusted by adjusting the angular position of the cylindrical member 21. In operation the cylindrical member 21 is rotated to a selected angular position to tend to pivot the masses 17 and 29 away from the null position, which is the position at which the pickup coil 41 generates no output signal, and the cylindrical member 21 is clamped in this selected angular position. The output pulses from the variable gain amplifier 13 are applied to the series connected force balance coils 37 and 39 to energize them in such a manner to tend to drive the masses 17 and 29 back to the null position against the spring force of the neck 27. Thus the rod 19 is a spring applying a force to the masses 17 and 29 in opposition to the force produced by the coils 37 and 39. If the impulse content of the output pulses of the variable gain amplifier is at the desired value, the pulses will drive the masses 17 and 29 precisely back to the null position and no output signal will be generated by the pickup coil 41. Should the impulse content of the output pulses of the variable gain amplifier rise above or fall below the desired value, the force balance coils 37 and 39 will not maintain the masses 17 and 29 at the null position and the pickup coil 41 will therefore generate a correction signal. This correction signal will be applied to the variable gain amplifier 13 to change the gain thereof so that the impulse content of the output pulses of the variable gain amplifier is brought back to the desired value. If the impulse content of the output pulses of the variable gain amplifier 13 falls below the desired value, the spring force of the neck 27 will overcome the force of the coils 37 and 39 and the masses 17 and 29 will move from the null position. The resulting correction signal generated by the pickup coil 41 will increase the gain of the amplifier 13 to thereby increase the impulse content of the output pulses from the variable gain amplifier so that the force produced by the coils 37 and 39 is increased and the displacement of the masses 17 and 29 from the null position is counteracted. In this manner the impulse content of the pulses is brought back to the desired value. If the impulse content of the ouput pulses of the variable gain amplifier 13 rises above the desired value, the force balance coils 37 and 39 will apply a force to the masses 17 and 29 overcoming that applied thereto by the spring force in the neck 27 and the masses 17 and 29 will move from the null position in the opposite direction from that when the impulse content of the output pulses from the variable gain amplifier is below the desired value. The pickup coil 41 will accordingly generate a correction signal which when applied to the variable gain amplifier 13 will decrease the gain thereof and thus reduce the gain of the variable gain amplifier 13 back to the desired value.

If it is desired to change the impulse content of the output pulses from the variable gain amplifier 13 to a new selected desired value, the angular position of the cylindrical member 21 is adjusted. This will accordingly change the displacement of the masses 17 and 29 from the null position when no pulses are applied to the force balance coils 37 and 39, and as a result pulses with a correspondingly different impulse content will be required to be applied to the force balance coils 37 and 39 to maintain the masses 17 and 29 at the null position. The pickup coil 41 will automatically control the gain of the variable gain amplifier 13 to change the impulse content of the output pulses from the variable gain amplifier 13 to the new desired value. Thus the impulse content of the output pulses of the variable gain amplifier 13 can be adjusted simply by adjusting the angular position of the cylindrical member 21.

The force coils may be similar to those used in a moving coil magnetic loud speaker. That is, they may be wound on cylindrical bobbins placed in a stationary radial annular magnetic field so that passage of a current through the coils cooperates with the stationary magnetic field to produce a force in the direction of the axis of the coils.

Alternatively, a moving iron force coil system may be used in which the force is produced in the same manner as in an electrical solenoid actuator or an electromagnetic relay.

In order to use the system of the present invention in a guidance or navigation system which is subjected to linear acceleration, the electromechanical unit 15 must be made insensitive to linear acceleration. For this reason the chamber 18 is filled with a liquid which has the same density as the masses 17 and 29 so that the masses 17 and 29 are fully floated within the chamber 18. Thus when the electromechanical unit 15 is subjected to a linear acceleration it will have no effect on the position of the masses 17 and 29 and will not affect the balance between the force balance coils 37 and 39 and the spring force exerted by the neck 27.

Figure 3:
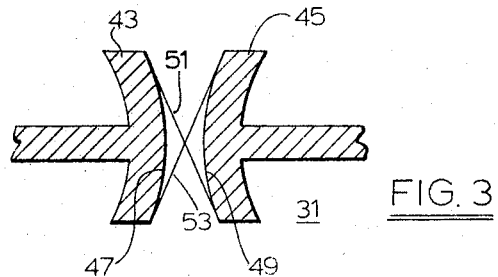
FIG. 3 is a sectional view illustrating a linkage used in the instrument of FIGURE 2.

The linkage 31, which is shown in more detail in FIGURE 3, serves the purpose of making the electromechanical unit 15 insensitive to angular acceleration. The linkage 31 as shown in FIG. 3 comprises a member 43 fixed to the mass 29 and a member 45 fixed to the mass 17. The members 43 and 45 have convex arcuate surfaces 47 and 49 facing one another. The radii of curvature of the arcuate surfaces 47 and 49 are equal with the center of the arcuate surface 47 being the pivot point in the neck 35 and the center of curvature of the arcuate surface 49 being the pivot point in the neck 27. The members 43 and 45 are joined by flexible bands 51 and 53. The band 51 is fixed to the member 43 at one side of the arcuate surface 47 and is fixed to the member 45 at the side of the arcuate surface 49 remote from the side of the arcuate surface 47 to which it is attached. The flexible band 53 also is fixed to the members 43 and 45 at remote sides of the arcuate surfaces 47 and 49 opposite the sides where the band 51 is fixed to the members 43 and 45. With this arrangement the bands 51 and 53 force the members 43 and 45 to pivot in opposite angular directions whenever either member pivots. The linkage permits pivoting as long as the members 43 and 45 pivot together in opposite angular directions.

When an angular acceleration is applied to the electromechanical unit 15 about an axis parallel to the pivot axes about which the masses 17 and 29 are pivotable, the masses 17 and 29 both tend to pivot in the same angular direction; that is they both tend to pivot either in a clockwise or counterclockwise direction depending upon the direction of the angular acceleration. The linkage 31, by forcing any pivoting of the masses 17 and 29 to be a combined movement with one mass moving clockwise and the other mass moving counterclockwise, makes the tendency of the mass 17 to pivot in response to an angular acceleration opposed by the tendency of the mass 29 to pivot in response to the same angular acceleration. The angular moments of inertia of the masses 17 and 29 about their respective pivot points are equal so that the tendencies of the masses to pivot in response to angular acceleration balance and no displacement of the masses in response to angular acceleration occurs.

Thus, there is provided a system for controlling the impulse content of pulses with an electromechanical impulse reference and the cumbersome electronic systems normally required in pulse torquing systems are eliminated.

Instead of the flexible necks 27 and 35, any suitable low friction bearing or suspension method may be used.

The biasing force may alternatively be supplied by a helical or other suitable spring means rather than by the flexure of neck 27.

If the unit is not subject to linear acceleration then the floating fluid in the chamber 18 can be eliminated. If the unit is not subject to angular acceleration, then only one of the masses 17 and 29 is required and accordingly, the mass 29, its supporting rod 33, the linkage 31, and the force balance coil 39 can be eliminated. In such an embodiment the pickup coil 41 would sense the position of the mass 17. These and many other modifications may be made to the above described specific embodiment of the invention without departing from the spirit and scope of the invention, which is defined in the appended claims.

What is claimed is:

1. A system for generating constant impulse content pulses comprising means to generate a train of pulses, a first movable mass, means responsive to said pulses to apply a first mechanical force to said first movable mass having a magnitude proportional to the impulse content of said pulses, means to pivotally support said movable mass about a first pivot point and apply a second mechanical force to said movable mass in opposition to said first mechanical force, a second movable mass, means pivotally supporting said second movable mass about a second pivot point, said first and second masses having equal moments of inertia about said first and second pivot points, means linking said first mass to said second mass requiring said first and second masses to pivot together in opposite angular directions when either of said first and second masses pivots, and means responsive to any displacement of said first and second masses from a null position to change the impulse content of said pulses in a direction to counteract the displacement of said masses from said null position.

2. An inertia reference comprising a first movable mass, means to apply a first mechanical force to said first movable mass having a magnitude proportional to the impulse content of applied pulses, means to pivotally support said movable mass about a first pivot point and apply a second mechanical force to said first movable mass in opposition to said first mechanical force, a second movable mass, means pivotally supporting said second movable mass about a second pivot point, said first and second masses having equal moments of inertia about said first and second pivot points, means linking said first mass to said second mass requiring said first and second masses to pivot together in opposite angular directions when either of said first and second masses pivots, and means to detect any displacement of said first and second masses from a null position.

3. A constant-impulse-content-pulse-generating system comprising:
   a housing;
   a movable member mounted in said housing with a single degree of freedom for displacement along a defined path;
   a source of electrical pulses at a constant repetition frequency;
   means for converting pulses from said source to a mechanical force proportional in magnitude to the impulse content of said pulses and tending to displace said member in one direction along said path;
   means for applying a second mechanical force of pre-established substantially constant magnitude to said member acting in opposition to said first mechanical force to resist displacement of said member; and
   means responsive to displacement of said movable member from a reference null position, in which said first and second forces are equal, to adjust the impulse content of said electrical pulses so as to restore the movable member to said null position.

References Cited by the Examiner

UNITED STATES PATENTS 3,162,795  12/1964  Cherniak _____ 318—32
3,176,521   4/1965  Clark _____ 318—32 X MILTON O. HIRSHFIELD, *Primary Examiner.*

J. J. SWARTZ, *Assistant Examiner.*